(12) United States Patent
Jin et al.

(10) Patent No.: US 12,344,230 B2
(45) Date of Patent: *Jul. 1, 2025

(54) SYSTEMS AND METHODS FOR CONTROLLING A HYBRID SYSTEM BASED ON TEMPERATURE ZONE AND POWER DEMAND

(71) Applicant: Cummins Inc., Columbus, IN (US)

(72) Inventors: Xing Jin, Columbus, IN (US); David Schmidt, Indianapolis, IN (US); Lu Qiu, Columbus, IN (US); Lisa A. Orth-Farrell, Columbus, IN (US); Ying Yuan, Rexford, NY (US); Jinyong Luo, Columbus, IN (US); Manik Narula, Columbus, IN (US)

(73) Assignee: Cummins Inc., Columbus, IN (US)

( * ) Notice: Subject to any disclaimer, the term of this patent is extended or adjusted under 35 U.S.C. 154(b) by 177 days.

This patent is subject to a terminal disclaimer.

(21) Appl. No.: 18/022,879

(22) PCT Filed: Jul. 20, 2021

(86) PCT No.: PCT/US2021/042347
§ 371 (c)(1),
(2) Date: Feb. 23, 2023

(87) PCT Pub. No.: WO2022/051035
PCT Pub. Date: Mar. 10, 2022

(65) Prior Publication Data
US 2023/0311846 A1 Oct. 5, 2023

Related U.S. Application Data

(60) Provisional application No. 63/073,166, filed on Sep. 1, 2020.

(51) Int. Cl.
*B60W 20/16* (2016.01)
*B60W 10/06* (2006.01)
*B60W 10/08* (2006.01)

(52) U.S. Cl.
CPC ............ *B60W 20/16* (2016.01); *B60W 10/06* (2013.01); *B60W 10/08* (2013.01);
(Continued)

(58) Field of Classification Search
CPC ...... B60W 20/16; B60W 10/06; B60W 10/08; B60W 2510/0666; B60W 2510/068;
(Continued)

(56) References Cited

U.S. PATENT DOCUMENTS 4,009,695 A * 3/1977 Ule ..................... F02D 41/0002
123/179.5
6,223,846 B1 * 5/2001 Schechter ................. F01L 9/10
180/165

(Continued)

FOREIGN PATENT DOCUMENTS

DE 102017130695 A1 6/2019
WO 2011135428 A1 11/2011
(Continued)

OTHER PUBLICATIONS

European Search Report and Written Opinion for EP 21864862.4, mailed Jul. 29, 2024.
(Continued)

*Primary Examiner* — Grant Moubry
*Assistant Examiner* — Ruben Picon-Feliciano
(74) *Attorney, Agent, or Firm* — Faegre Drinker Biddle & Reath LLP

(57) ABSTRACT

Systems and methods for controlling a hybrid system. For example, a computer-implemented method includes determining a system temperature zone of the aftertreatment
(Continued)

system as being in: a first temperature zone below a first temperature threshold, a second temperature zone from the first temperature threshold to a second temperature threshold, or a third temperature zone above the second temperature threshold; determining a power demand corresponding to the operation of the hybrid system as being in: a first power demand zone if the power demand is below a power threshold, or a second power demand zone if the power demand is equal to or greater than the power threshold; and determining a control strategy based at least in part on the determined system temperature zone and the determined power demand.

20 Claims, 10 Drawing Sheets

(52) U.S. Cl.
CPC .............. *B60W 2510/0666* (2013.01); *B60W 2510/068* (2013.01); *B60W 2510/085* (2013.01); *B60W 2540/10* (2013.01)

(58) Field of Classification Search
CPC ........ B60W 2510/085; B60W 2540/10; B60Y 2300/474; F02D 29/02; F02D 41/024; F02D 13/0203; F02D 41/0087; F01N 2240/16; F01N 2430/06; F01N 2430/10; F01N 2560/06; F01N 2590/08; F01N 2590/11; F01N 2900/0406; F01N 2900/08; F01N 2900/1602; F01N 3/2013; F01N 9/00; Y02T 10/62; Y02T 10/40
See application file for complete search history.

(56) References Cited

U.S. PATENT DOCUMENTS

| | | | |
|---|---|---|---|
| 7,464,675 B1* | 12/2008 | Schechter | ........... F02D 13/0219 180/165 |
| 8,473,177 B2 | 6/2013 | Madurai Kumar | |
| 8,516,798 B2 | 8/2013 | Dobson | |
| 8,650,860 B2 | 2/2014 | Applegate | |
| 8,683,781 B2 | 4/2014 | Yacoub | |
| 8,826,644 B2 | 9/2014 | Ponnathpur | |
| 9,062,584 B2 | 6/2015 | Zhang | |
| 9,243,541 B2 | 1/2016 | Sujan et al. | |
| 9,677,493 B2 | 6/2017 | Stewart | |
| 11,846,222 B2* | 12/2023 | Jin | ........................ B60W 20/16 |
| 2010/0146938 A1 | 6/2010 | Baum | |
| 2012/0090294 A1* | 4/2012 | Sujan | ...................... F01N 3/027 60/274 |
| 2012/0173062 A1* | 7/2012 | Madurai Kumar | ... B60W 20/13 903/903 |
| 2014/0238327 A1* | 8/2014 | Hagen | .................. F02M 21/029 123/1 A |
| 2019/0271245 A1 | 9/2019 | De Smet et al. | |
| 2021/0062742 A1* | 3/2021 | Hotta | .................... F02D 41/062 |
| 2022/0316387 A1* | 10/2022 | Blythe | ...................... F02G 5/02 |

FOREIGN PATENT DOCUMENTS

| | | |
|---|---|---|
| WO | 2014188875 A1 | 11/2014 |
| WO | 2016097526 A1 | 6/2016 |

OTHER PUBLICATIONS

European Search Report and Written Opinion for EP 21864862.4, mailed Aug. 16, 2024.

International Search Report and Written Opinion for International patent application No. PCT/US2021/042347, filed Jul. 20, 2021, mailed Oct. 22, 2021.

International Preliminary Report on Patentability received for PCT Patent Application No. PCT/US2021/042347, mailed on Mar. 16, 2023, 7 pages.

* cited by examiner

SYSTEMS AND METHODS FOR CONTROLLING A HYBRID SYSTEM BASED ON TEMPERATURE ZONE AND POWER DEMAND

CROSS-REFERENCE TO RELATED APPLICATIONS

This application is a national stage of and claims priority to International Patent Application No. PCT/US2021/042347, filed Jul. 20, 2021, which claims priority to Provisional Application No. 63/073,166, filed Sep. 1, 2020, which are herein incorporated by reference in their entirety.

FIELD OF THE DISCLOSURE

Certain embodiments of the present disclosure are directed to hybrid vehicles. More particularly, some embodiments of the disclosure provide systems and methods for controlling a hybrid system based at least in part upon aftertreatment temperature zone and power demand of the hybrid system.

BACKGROUND OF THE DISCLOSURE

With increasing efforts in limiting greenhouse gas emissions from transportation, regulations regarding internal combustion engines are increasingly stringent, particularly in the metric of nitric oxides (NOX) emissions. Vehicle electrification has been considered as one promising way to meet the regulations. However, for a modern hybrid system, a significant amount of NOx is generated during engine cold start, during which an aftertreatment system is ineffective. The aftertreatment system often includes a selective catalytic reduction (SCR) system. In order to meet future low NOx emission standards required by regulations, it is desirable to have systems and methods for controlling the hybrid system to reduce NOx emissions.

BRIEF SUMMARY OF THE DISCLOSURE

In various embodiments, a computer-implemented method for controlling a hybrid system including an electric motor, a combustion engine, an aftertreatment system, and an electric heater coupled to the aftertreatment system, comprises: determining a system temperature zone of the aftertreatment system as being in: a first temperature zone below a first temperature threshold, a second temperature zone from the first temperature threshold to a second temperature threshold, or a third temperature zone above the second temperature threshold; determining a power demand corresponding to the operation of the hybrid system as being in: a first power demand zone if the power demand is below a power threshold, or a second power demand zone if the power demand is equal to or greater than the power threshold; and determining a control strategy based at least in part on the determined system temperature zone and the determined power demand. In certain examples, the control strategy includes a control command of setting the hybrid system to compressor mode when: the determined system temperature zone is in the first temperature zone and the determined power demand is zero, or the determined system temperature zone is in the first temperature zone and the determined power demand is in the first power demand zone. In certain examples, the control strategy further includes one control command selected from: setting the hybrid system to power-split mode, setting the hybrid system to motor-operation mode, and setting the hybrid system to engine-operation mode.

In various embodiments, a system for controlling a hybrid system including an electric motor, a combustion engine, an aftertreatment system, and an electric heater coupled to the aftertreatment system, the system comprises: a temperature zone determining module configured to determine a system temperature zone of the aftertreatment system as being in: a first temperature zone below a first temperature threshold, a second temperature zone from the first temperature threshold to a second temperature threshold, or a third temperature zone above the second temperature threshold; a power demand determining module configured to determine a power demand corresponding to the operation of the hybrid system as being in: a first power demand zone if the power demand is below a power threshold, or a second power demand zone if the power demand is equal to or greater than the power threshold; and a control strategy determining module configured to determine a control strategy based at least in part on the determined system temperature zone and the determined power demand. In certain examples, the control strategy includes a control command of setting the hybrid system to compressor mode when: the determined system temperature zone is in the first temperature zone and the determined power demand is zero, or the determined system temperature zone is in the first temperature zone and the determined power demand is in the first power demand zone. In certain examples, the control strategy further includes one control command selected from: setting the hybrid system to power-split mode, setting the hybrid system to motor-operation mode, and setting the hybrid system to engine-operation mode.

In various embodiments, a non-transitory computer-readable medium with instructions stored thereon, that when executed by a processor, cause the processor to perform: determining a system temperature zone of the aftertreatment system as being in: a first temperature zone below a first temperature threshold, a second temperature zone from the first temperature threshold to a second temperature threshold, or a third temperature zone above the second temperature threshold; determining a power demand corresponding to the operation of the hybrid system as being in: a first power demand zone if the power demand is below a power threshold, or a second power demand zone if the power demand is equal to or greater than the power threshold; and determining a control strategy based at least in part on the determined system temperature zone and the determined power demand. In certain examples, the control strategy includes a control command of setting the hybrid system to compressor mode when: the determined system temperature zone is in the first temperature zone and the determined power demand is zero, or the determined system temperature zone is in the first temperature zone and the determined power demand is in the first power demand zone. In certain examples, the control strategy further includes one control command selected from: setting the hybrid system to power-split mode, setting the hybrid system to motor-operation mode, and setting the hybrid system to engine-operation mode.

It should be understood that the present disclosure is not limited to the details or methodology set forth in the description or illustrated in the Figures, i.e. number of temperature zones, number of power zones, etc.

DETAILED DESCRIPTION OF THE DRAWINGS

Certain embodiments of the present disclosure are directed to hybrid vehicles. More particularly, some embodiments of the disclosure provide systems and methods for controlling a hybrid system based at least in part upon temperature zone and power demand of the hybrid system.

Figure 1:
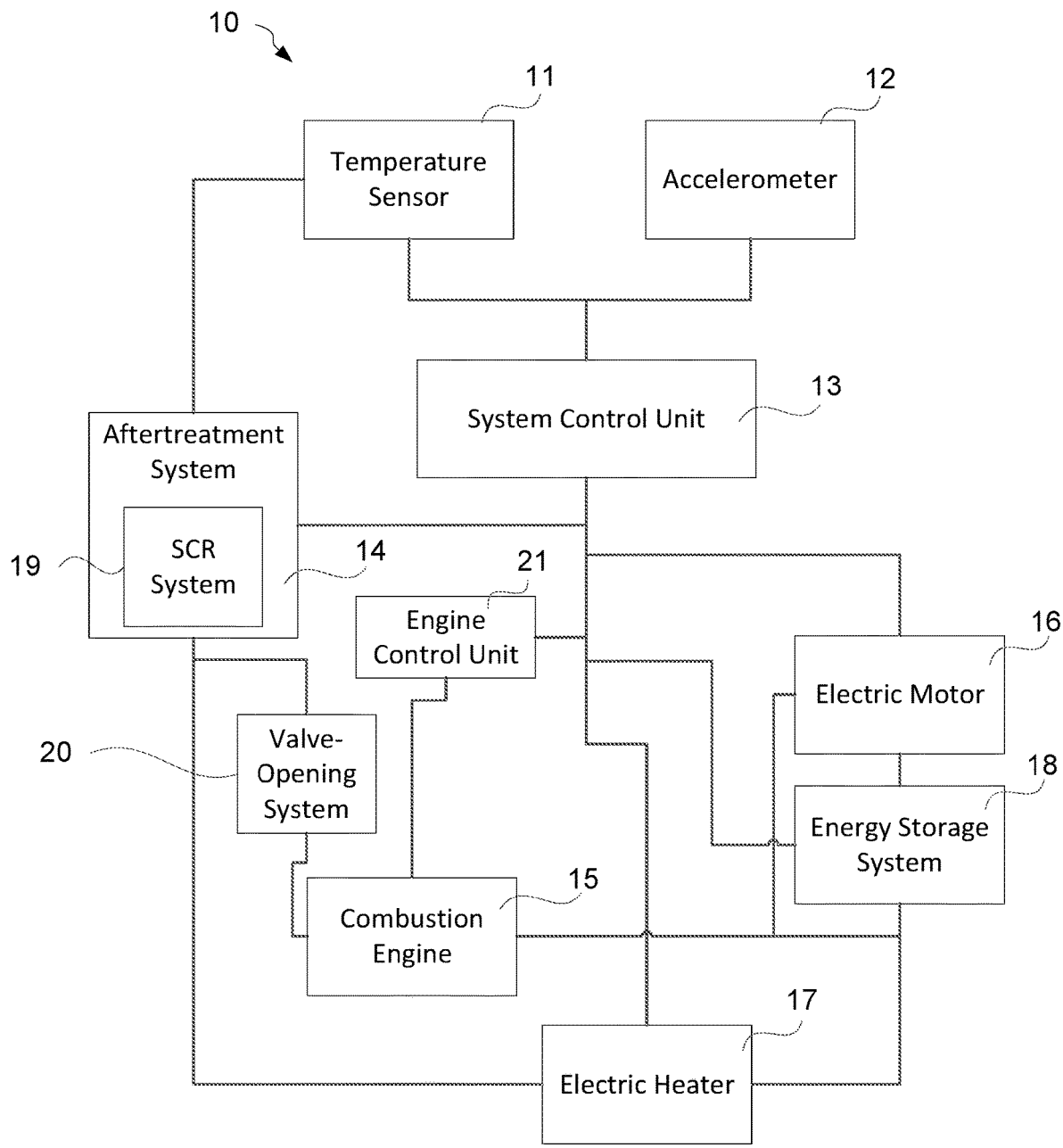
FIG. 1 is a simplified system diagram depicting a hybrid system 10, according to some embodiments of the present disclosure.

FIG. 1 is a simplified system diagram depicting a hybrid system 10, according to some embodiments of the present disclosure. The hybrid system 10 may be a hybrid system of a hybrid vehicle and includes a temperature sensor 11, an accelerometer 12, a system control unit (SCU) 13, an aftertreatment system 14, a combustion engine 15, an electric motor 16, an electric heater 17, and an energy storage system 18. The temperature sensor 11 (e.g., a physical or a virtual sensor) may be configured to determine a system temperature of the aftertreatment system 14. The accelerometer 12 (e.g., a vehicle throttle) may be configured to determine an acceleration of the vehicle. SCU 13 may be configured to house a control system and to implement a method (see FIG. 2) for controlling the hybrid system (e.g., via switches and/or actuators) by controlling the combustion engine 15, the electric heater 17, and the electric motor 16. SCU 13 may include a control strategy determining module configured to determine a control command including setting the mode of the combustion engine 15, the mode of the electric motor 16, and/or the mode of the electric heater 17. SCU 13 may include a mode-setting module configured to change the mode of the combustion engine 15, the mode of the electric motor 16, and/or the electric heater 17. The aftertreatment system 14 is configured to convert regulated pollutant NOx to H$_2$O and may include a selective catalytic reduction (SCR) system 19. The hybrid system 10 may further include a valve-opening system 20 configured to open to enable heated air to pass from the combustion engine 15 to the aftertreatment system 14. Although valve-opening system 20 is shown as a separate component, valve-opening system 20, or portions thereof, may be incorporated with combustion engine 15, e.g. an exhaust valve. The combustion engine 15 (e.g., a two-strokes engine or a four-strokes engine) is configured to, under control of SCU 13 (e.g., via an engine control unit 21), provide power to accelerate the vehicle, to run as a compressor to provide heated air to the aftertreatment system 14, and optionally to provide energy for charging the energy storage system 18. The electric motor 16 is configured to provide power to accelerate the vehicle and to drive (e.g. rotate the crankshaft) the combustion engine 15 when in a compressor mode. The electric motor 16 may operate as a motor and/or a generator. The electric heater 17 (e.g., an exhaust heater or an electric catalyst heater) is configured to, optionally, provide heat to the aftertreatment system 14. The heater energy may be provided by the energy storage system 18 or from the electricity generated by the electric motor 16. The heater energy may be provided by the energy storage system 18 or from the electricity generated by the electric motor 16. The electric heater may be external to the aftertreatment system or an internal component of the aftertreatment system. The energy storage system 18 (e.g., a battery, a fuel cell, a supercapacitor, a flow cell) is configured to provide electric power to the electric motor 16 and is connected to the SCU 13 to enable SCU 13 to monitor an energy level of the energy storage system.

Figure 2:
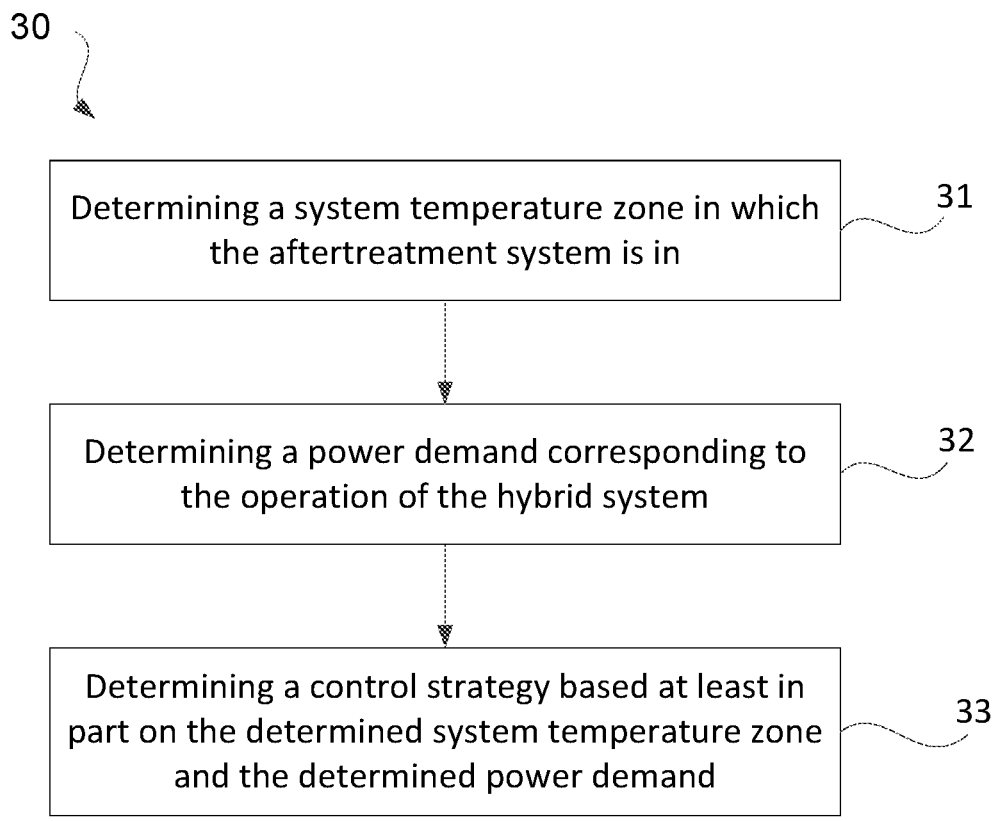
FIG. 2 is a simplified flowchart showing a method 30 for determining a control strategy for a hybrid system, according to some embodiments of the present disclosure.

FIG. 2 is a flowchart of a method 30 for determining a control strategy for a hybrid system (e.g., hybrid system 10), according to some embodiments of the present disclosure. The method 30 includes, at 31, determining a system temperature zone in which an aftertreatment system (e.g., aftertreatment system 14) of the hybrid system is in, at 32, determining a power demand corresponding to the operation of the hybrid system, and at 33, determining a control strategy based at least in part on the determined system temperature zone and the determined power demand.

Figure 3:
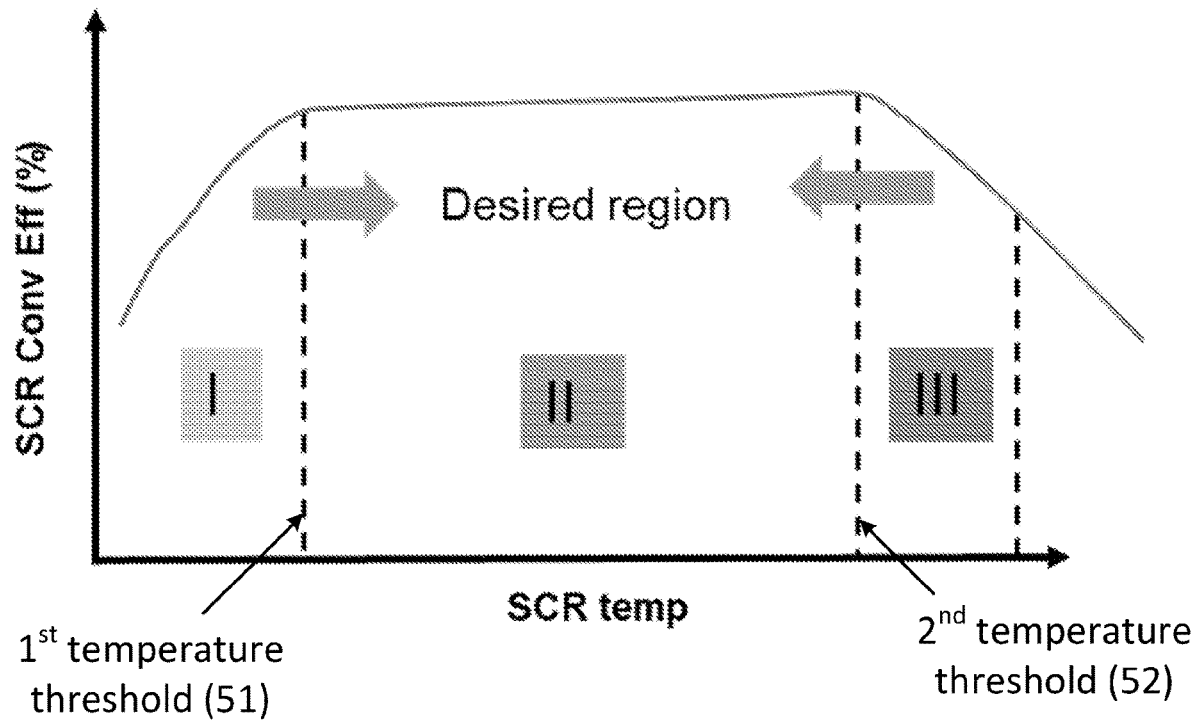
FIG. 3 is a graph depicting an efficiency vs. temperature relationship of a selective catalytic reduction system (SCR) of an aftertreatment system.

At 31, determining a system temperature zone in which the aftertreatment system is in includes measuring the system temperature using a temperature sensor (e.g., temperature sensor 11) or receiving a measured temperature of the aftertreatment system. The system temperature may be the temperature of a SCR system (e.g., SCR system 19) of the aftertreatment system (e.g., aftertreatment system 14). Determining the system temperature zone includes comparing the system temperature to thresholds that determine the boundaries of the zones. In one example, there are three zones defined by two thresholds. As illustrated in FIG. 3, the system temperature zone is a first temperature zone if the system temperature is below a first temperature threshold 51, the system temperature zone is a second temperature zone if the system temperature is between the first temperature threshold 51 and a second, higher, temperature threshold 52, and the system temperature zone is a third temperature zone if the system temperature is above the second temperature threshold 52. The second temperature zone may include a temperature in which the SCR system operates at optimal conversion efficiencies. Additional thresholds may be incorporated to define additional temperature zones. In certain embodiments, the method 30 further includes determining a conversion efficiency of the aftertreatment system or of the SCR system of the aftertreatment system. For example, determining the conversion efficiency includes looking up an efficiency vs temperature look-up-table, which may correspond to an efficiency vs. temperature curve as shown in FIG. 3.

At 32, determining a power demand corresponding to the operation of a hybrid system (e.g., hybrid system 10) includes determining an acceleration input of the vehicle in which the hybrid system is installed. For example, determining the power demand to be zero, in a first power demand zone below a power threshold and greater than zero, or in a second power demand zone greater or equal to the power threshold. The acceleration input may correspond to movement of an accelerator pedal or may be deduced based on sensed movement, for example with an accelerometer (e.g., accelerometer 12), which may be connected to sense motion of the accelerator pedal or the vehicle. For example, the vehicle is not accelerating when power demand is determined to be zero, the vehicle is accelerating at a slow acceleration when power demand is determined to be in the first power demand zone, and the vehicle is accelerating at a high acceleration when power demand is determined to be in the second power demand zone.

To help avoid cold start, during which the aftertreatment system 14 of a hybrid system 10 is ineffective, the SCU 13 provides instructions in accordance with the method 30 based at least in part on to the system temperature and power demand, to the combustion engine 15, the electric motor 16, and/or the electric heater 17 of the hybrid system 10 to warm up the aftertreatment system 14. For example, when the system temperature is low (e.g., below the first temperature threshold of FIG. 3 or FIG. 6), the electric heater is instructed by the SCU 13 to switch on to heat the exhaust flow and thus the aftertreatment system. If the power demand is zero or small (e.g., in a first power zone below a power threshold), the SCU 13 sets electric motor 16 to drive combustion engine 15 as a compressor, optionally sets electric heater to on, and operates the valve-opening system 20 to enable flow of heated air from the combustion engine 15 to heat the aftertreatment system 14.

At 33, determining a control strategy based at least in part on the determined system temperature zone and the determined power demand includes determining the control strategy to include one control command selected from setting a hybrid system (e.g., hybrid system 10) to power-split mode, setting the hybrid system to motor-operation mode, setting the hybrid system to engine-operation mode, setting the hybrid system to compressor mode, setting the hybrid system to engine-charge mode, setting an electric heater of the hybrid system to on, and/or setting the electric heater of the hybrid system to off. The setting may be done by a system control unit (e.g., SCU 13) of the hybrid system, such as by controlling one or more clutches of the vehicle, and controlling a combustion engine, an electric motor, the heater, and/or a valve of the hybrid system.

In various embodiments, the control command of setting the hybrid system to power-split mode includes splitting power between the engine and the motor, such as by setting the electric motor and engine to operate at different power levels to deliver power at least equal to or greater than the determined power demand. In the power-split mode, the combustion engine may be set to work at good efficiency region and/or lower emission region, such as based on the temperature zone and/or the power demand.

In some examples, the control command of setting the hybrid system to motor-operation mode includes setting the electric motor to deliver power at least equal to or greater than the determined power demand. In some examples, the control command of setting the hybrid system to engine-operation mode includes setting the combustion engine to deliver power at least equal to or greater than the determined power demand.

In some examples, the control command of setting the hybrid system to compressor mode includes setting the combustion engine to operate as a compressor to heat the aftertreatment system. In some examples the control command of setting the hybrid system to compressor mode includes setting a valve-opening system (e.g., valve-opening system 20) to open to enable heated air to travel from the engine to the aftertreatment system. In some examples, the control command of setting the hybrid system to engine-charge mode includes setting the combustion engine to deliver power greater than the determined power demand at least by a charging power demand for charging an energy storage system (e.g., energy storage system 18) connected to the electric motor. For example, the excess power generated is converted into electrical energy by the electric motor working as a generator of the vehicle for charging the energy storage system.

In some embodiments, when the determined system temperature zone is in the first temperature zone and the determined power demand is zero or in the first power demand zone, at 33, the control strategy includes the control commands of setting the hybrid system to compressor mode to heat the aftertreatment system, setting the electric heater to off, and/or setting the hybrid system to motor-operation mode to deliver power at least greater than or equal to the determined power demand.

In some embodiments, when the determined system temperature zone is in the first temperature zone and the determined power demand is zero or in the first power demand zone, at 33, the control strategy includes the control commands of setting the hybrid system to compressor mode to heat the aftertreatment system, setting the electric heater of the hybrid system to on to heat the aftertreatment system, and/or setting the hybrid system to motor-operation mode to deliver power at least greater than or equal to the determined power demand.

In some embodiments, when the determined system temperature zone is in the first temperature zone and the determined power demand is in the second power demand zone, at 33, the control strategy includes the control commands of setting the hybrid system to power-split mode to deliver power at least greater than or equal to the determined power demand, and/or setting the electric heater of the hybrid system to on to heat the aftertreatment system.

In some embodiments, when the determined system temperature zone is in the second temperature zone and the determined power demand is in the first power demand zone, at 33, the control strategy includes the control commands of setting the hybrid system to power-split mode or motor-operation mode to deliver power at least greater than or equal to the determined power demand, and/or setting the electric heater of the hybrid system to on.

In some embodiments, when the determined system temperature zone is in the second temperature zone and the determined power demand is in the second power demand zone, at 33, the control strategy includes the control commands of setting the hybrid system to power-split mode or engine-operation mode to deliver power at least greater than or equal to the determined power demand, and/or setting the electric heater of the hybrid system to on.

In some embodiments, when the determined system temperature zone is in the third temperature zone, at 33, the control strategy includes the control command of setting the hybrid system to one of power-split mode and engine-operation or motor-operation mode to optimize the overall vehicle fuel efficiency to deliver power greater than or equal to the determined power demand; and/or setting the electric heater of the hybrid system to off.

In certain embodiments, the computer-implemented method 30 further includes determining an energy-level corresponding to an energy storage system (e.g., energy storage system 18) connected to the electric motor, and wherein the determining a control strategy is further based on the determined energy-level. In some examples, when the determined energy-level is below an energy threshold, at 33, the control strategy includes the control command of setting the hybrid system to engine-charge mode to recharge the energy storage system. The energy threshold may be a preset value predetermined by a user or by a manufacturer and may be customizable via a control interface, such as a control interface of the vehicle in which the energy storage system and the hybrid system are installed.

Figure 4:
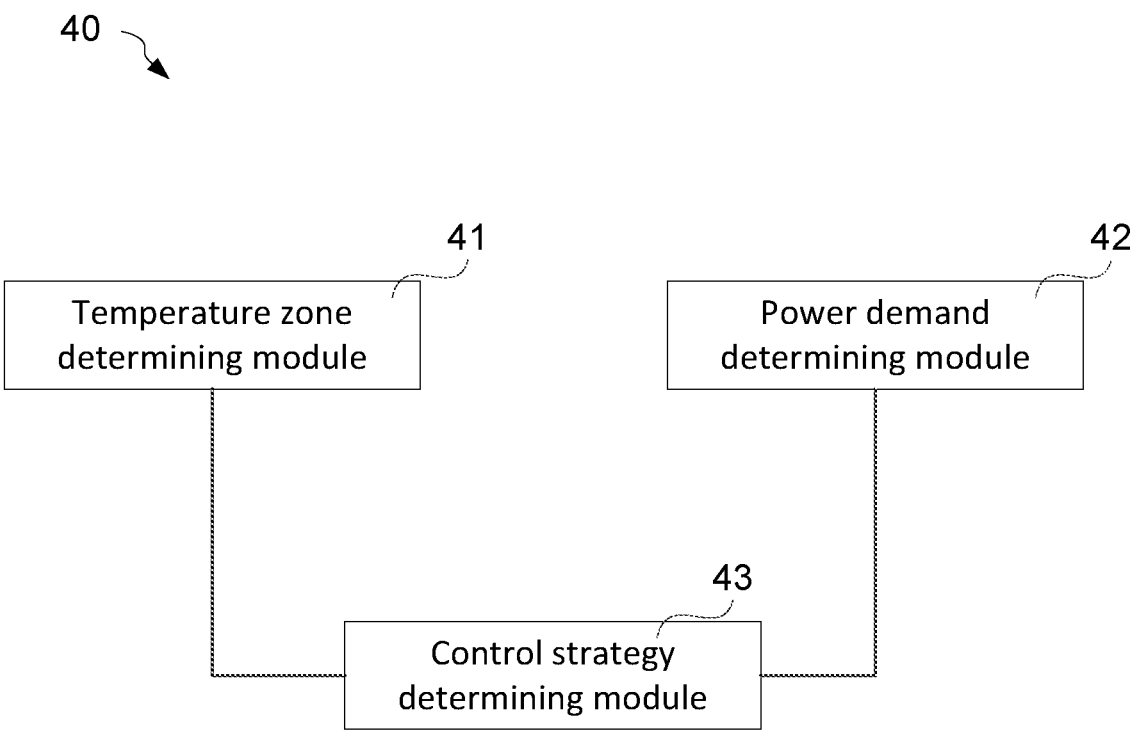
FIG. 4 is a block diagram depicting a control system 40 for controlling a hybrid system by implementing method 30 depicted in FIG. 2.

FIG. 4 is a block diagram depicting a control system 40 for controlling a hybrid system (e.g., hybrid system 10) by implementing method 30 depicted in FIG. 2. The control system 40 includes a temperature zone determining module 41 configured to determine the system temperature zone in which the aftertreatment system is in, a power demand determining module 42 configured to determine a power demand corresponding to the operation of the hybrid system, and a control strategy determining module 43 configured to determine a control strategy based at least in part on the determined system temperature zone and the determined power demand. The control system 40 may be stored in a system control unit (e.g., system control unit 13). In some examples, the control system 40 is configured to condition an aftertreatment system of a hybrid system including an electric motor and a combustion engine and may be part of the hybrid system or a separate unit. The control system 40 can be used with various hybrid systems including mild hybrid systems, strong hybrid systems, parallel-architecture hybrid systems, serial-architecture hybrid systems, serial-parallel-architecture hybrid systems, and/or range-extended hybrid systems. In some examples, the control system 40 is more effective in reducing NOx emissions for strong hybrid systems than for mild hybrid systems. For example, a strong hybrid system where the electric motor is used more when the vehicle is running may reduce NOx emissions in a greater degree by adapting the control system 40 than a mild hybrid system where the electric motor is only used sparingly, such as to assist a combustion engine.

In various examples, the control system 40 is configured to condition a SCR system or other part of the aftertreatment system, such as to raise the temperature of the SCR system or other part prior to fuel injection into the hybrid system. In certain examples, the control system 40 is configured to help condition the aftertreatment system to operate at desired temperatures for optimal conversion efficiencies (see FIG. 3 or FIG. 6). In certain examples, the control system 40 is configured to, via determining and implementing control strategies, heat the aftertreatment system to avoid cold start, thereby reducing NOx emissions. The NOx emissions of a vehicle can be represented by the system output NOx (SONOx). In various examples, the control system 40 is configured to reduce SONOx by increasing SCR conversion efficiency by conditioning the aftertreatment system, such that a greater amount of the NOx emissions of the engine of the vehicle is converted to less harmful molecules. In certain examples, the control system 40 is configured to control a valve-opening system (e.g., valve-opening system 20) configured to open between the combustion engine and the aftertreatment system to allow heated air from the combustion engine in compressor mode to flow into the aftertreatment system and thereby heating the aftertreatment system.

Figure 5:
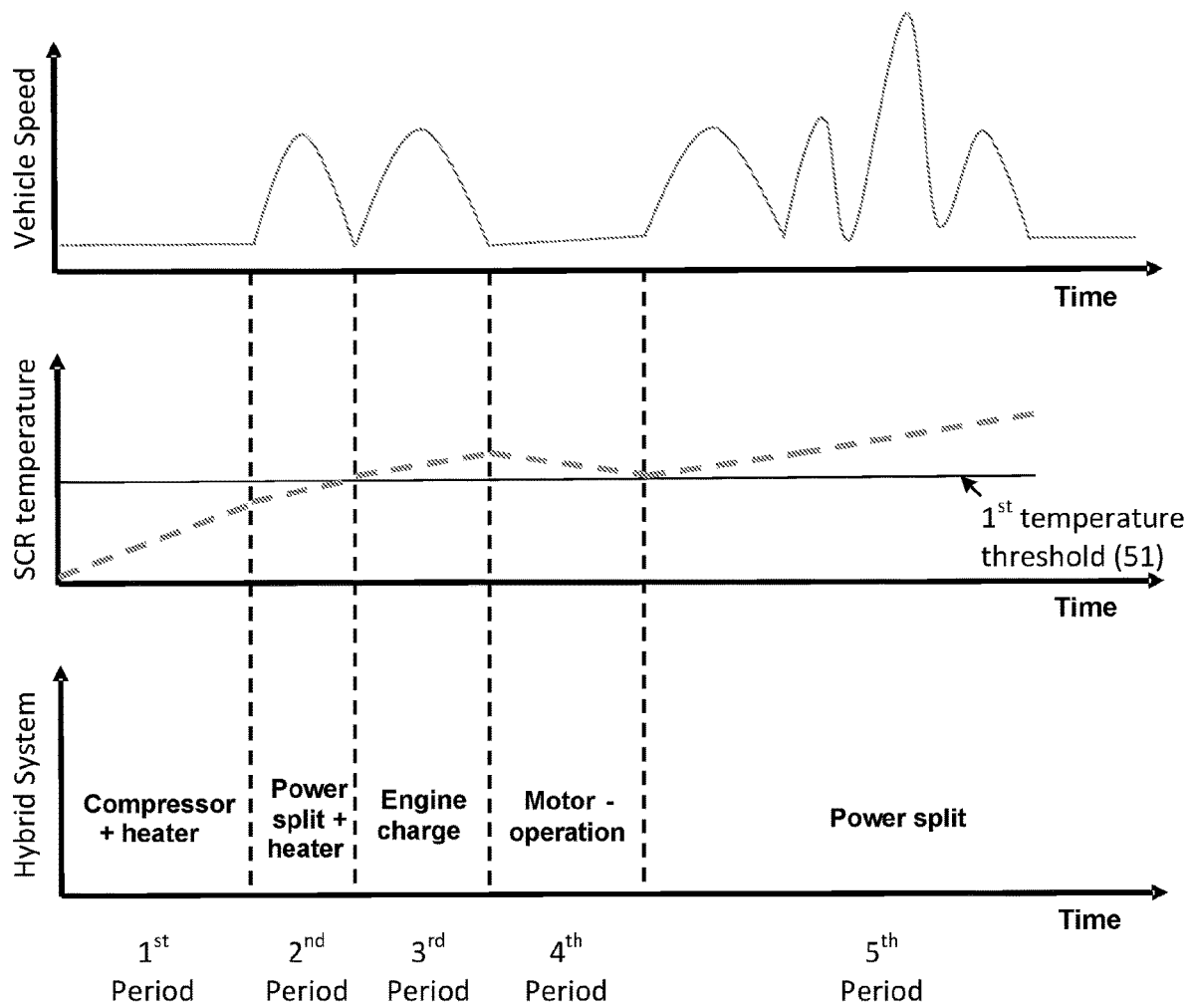
FIG. 5 is a graph depicting a timing diagram of the control system of FIG. 4 showing a plurality of modes.

FIG. 5 is a graph depicting a timing diagram of the control system of FIG. 4 showing the changing of hybrid system modes at different vehicle speeds and SCR temperatures. As illustrated, a control system (e.g., the control system 40) is configured to perform a method (e.g., the method 30) for determining a control strategy to transition a hybrid system between a compressor mode, a power-split mode, an engine-charge mode, and a motor-operation mode. As shown, the mode of the hybrid system is selected at least based on the temperature of the system and/or the power demand, which may be represented by the acceleration of the vehicle as illustrated by the vehicle speed curve in FIG. 5. In this example, it is desirable to maintain the SCR temperature above the first temperature threshold for optimal SCR conversion efficiencies. Thus, when the SCR temperature is below the first temperature threshold, the control strategy includes setting the hybrid system to modes configured to heat the aftertreatment system.

As illustrated, at a first time period, when the temperature of the SCR system is lower than a first temperature threshold 51 and the power demand of the hybrid system 10 is zero or approximately zero, the control strategy includes setting the hybrid system to compressor mode and/or the electric heater 17 to on to heat the aftertreatment system. In the compressor mode, the electric motor of the hybrid system may drive the combustion engine as a compressor to heat up air for heating the aftertreatment system. Operating the combustion engine as a compressor entails closing the intake and exhaust valves of a combustion chamber, then turning the crankshaft to move a piston from bottom dead center to top dead center in the combustion chamber, thereby compressing the air enclosed in the combustion chamber to increase the air temperature, then opening the exhaust valves to allow the compressed (and heated) air to escape the combustion chamber. At a second time period, when the temperature of the SCR system is lower than the first temperature threshold and when the power demand is high, the control strategy includes setting the hybrid system to power-split mode and the electric heater to on to moderately heat the aftertreatment system. In the power-split mode, both the electric motor and the combustion engine are running to provide power for accelerating the vehicle. The combustion engine, when running, delivers heated exhaust to the aftertreatment system to continue to help raise SCR temperature. At a third time period, when the temperature of the SCR system is higher than the first temperature threshold and when the power demand is high, the control strategy includes setting the hybrid system to engine-charge mode and the electric heater to off. In engine-charge mode, the electric motor works as a generator and the combustion engine runs at a work capacity required for accelerating the vehicle and for providing energy (e.g., electric motor works as generator) for charging an energy storage system connected to the electric motor. At a fourth time period, when the temperature of the SCR system is higher than the first temperature threshold and when the power demand is low, the control strategy includes setting the hybrid system to motor-operation mode and the electric heater is set to off. In motor-operation mode, the combustion engine is set to off and the electric motor provides all the power needed to accelerate the vehicle. With the combustion engine and the electric heater set to off, as shown in FIG. 5, which may help prevent the SCR system to become too hot (e.g., above a second temperature threshold, see FIG. 3). At a fifth time period, when the temperature of the SCR system is higher than the third temperature threshold and when the power demand is high, the control strategy includes setting the hybrid system to power-split mode and the electric heater is set to off. Alternatively, the hybrid system may be set to motor-only mode, depending on the instantaneous power demand.

In some embodiments, systems and methods disclosed, by adapting one or more control commands associated with a control strategy, lead to extended high SCR conversion efficiency time during operation, improved vehicle fuel efficiency, reduced NOx emissions, and reduced fuel consumption. For example, systems and methods may adapt one or more control commands for an optimized powertrain power management strategy by adjusting the modes (e.g., power-split, engine-operation, motor-operation, engine-charge) of a hybrid system of a vehicle to warm up an aftertreatment system of the hybrid system when a system temperature of the aftertreatment system is low. In certain examples, hybrid systems provide effective fuel use to further improve vehicle fuel efficiency and may reduce NOx and other emissions, such as by taking the temperature of the aftertreatment system into consideration for maintaining high SCR conversion efficiency to not only reduce NOx emission but also reduce fuel consumption. Systems and methods disclosed may make use of hybrid functionalities and aftertreatment system information to determine a control strategy for the powertrain to help regulate the temperature of the aftertreatment system and to reduce fuel consumption and emissions.

Figure 6:
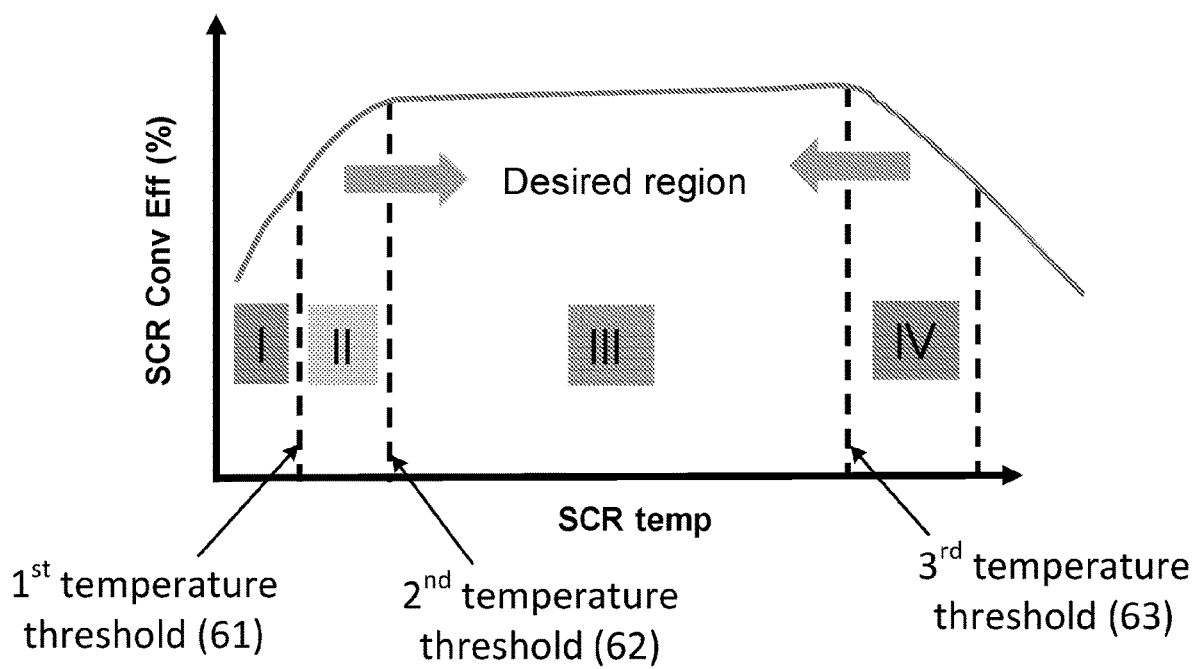
FIG. 6 is a graph depicting an efficiency vs. temperature relationship of a selective catalytic reduction system (SCR) of an aftertreatment system.

FIG. 6 is a graph depicting an efficiency vs. temperature relationship of a selective catalytic reduction system (SCR) of an aftertreatment system. Based at least in part upon the SCR efficiency, SCR temperature may be divided into four zones as illustrated. In each zone, a different hybrid system mode may be set, as part of a control strategy, to help regulate SCR temperature and reduce fuel consumption. In a first temperature zone, where the SCR temperature is low where the SCR conversion efficiency is low, a control strategy configured to help warm up the SCR and/or reduce engine-out emission (e.g., NOx) may be adopted. In a second temperature zone, where the SCR temperature is slightly lower than a desired threshold temperature and where the conversion efficiency is slightly below a target threshold efficiency, a control strategy configured to help warm up the SCR and/or reduce engine-out emission (e.g., NOx) may be adopted. In a third temperature zone, where the SCR temperature is above the desired threshold temperature and where the conversion efficiency is good or satisfactory, a control strategy configured to help maintain SCR temperature and improve overall system fuel efficiency may be adopted. In a fourth temperature zone, where the SCR temperature is substantially above the desired threshold temperature and where the conversion efficiency is lowered due to an overly hot condition, a control strategy configured to help reduce SCR temperature may be adopted.

In some examples, when the SCR temperature is lower than a lower target temperature, such as in the first temperature zone and in the second temperature zone, the control strategy may include setting the hybrid system to engine-charge mode to help warm up the aftertreatment system, setting the hybrid system to generator mode and an electric heater to on to warm up the aftertreatment system, setting the hybrid system to motor-operation mode (e.g., EV mode) to avoid EONOx generation, and engine cylinder deactivation mode to help keep the aftertreatment system warm. In some examples, when the SCR temperature is higher than an upper target temperature, such as in the fourth temperature zone, the control strategy may include setting the hybrid system to power-split mode to reduce engine load or generator mode to blow cold air to help reduce SCR temperature. When in the generator mode, the vehicle may be stationary, and the combustion engine provides power to charge a battery. When in the EV mode, the battery provides accessory power and capture regenerated energy (e.g., in mild hybrid systems), or operates its electric motor to propel the vehicle. When in engine-charge mode, the vehicle is moving, and the combustion engine provides an extra amount of power to charge the battery. When in power-split mode, the vehicle is moving and the power is split between the combustion engine and the electric motor to propel the vehicle.

Returning to method 30 of FIG. 2 at 31, determining the system temperature zone includes comparing the system temperature to thresholds that determine the boundaries of the zones. In one example, there are four zones defined by three thresholds. As illustrated in FIG. 6, the system temperature zone is a first temperature zone if the system temperature is below a first temperature threshold 61, the system temperature zone is a second temperature zone if the system temperature is between the first temperature threshold 61 and a second, higher temperature threshold 62, the system temperature zone is a third temperature zone if the system temperature is between the second temperature threshold 62 and a third, higher, temperature threshold 63, and the system temperature zone is a fourth temperature zone if the system temperature is above the third temperature threshold 63. The first temperature zone may include a temperature in which the SCR system operates at undesirably low conversion efficiency. The third temperature zone may include a temperature in which the SCR system operates at optimal conversion efficiencies. Additional thresholds may be incorporated to define additional temperature zones. In certain embodiments, the method 30 further includes determining a conversion efficiency of the aftertreatment system or of the SCR system of the aftertreatment system. For example, determining the conversion efficiency includes using an efficiency vs temperature look-up-table, which may correspond to an efficiency vs. temperature curve as shown in FIG. 6.

Returning to method 30 of FIG. 2, when the determined system temperature zone is in the first temperature zone or the second temperature zone in FIG. 6, at 33, the control strategy includes the control commands of setting the hybrid system to compressor mode to heat the aftertreatment system, setting the electric heater of the hybrid system to on to heat the aftertreatment system, and/or setting the combustion engine to off. In some examples, when the SCR temperature is in the first temperature zone and/or in the second temperature zone, the control strategy includes setting the hybrid system to EV mode to avoid NOx generation, setting the hybrid system to engine-as-compressor mode and the electric heater to on, setting the hybrid system to generator mode and the electric heater to on, setting the hybrid system to power-split mode and the electric heater to on, or setting the hybrid system to engine-charge mode and the electric heater to on. In some examples, when the SCR temperature is in the third temperature zone, the control strategy includes setting the hybrid system to EV mode to avoid NOx generation, setting the hybrid system to generator mode and the electric heater to on, setting the hybrid system to engine-only mode, setting the hybrid system to engine-charge mode and the electric heater to off, or setting the hybrid system to power-split mode and the electric heater to off. In some examples, when the SCR temperature is in the fourth temperature zone, the control strategy includes setting the hybrid system to generator mode and the electric heater to off, setting the hybrid system to power-split mode and the electric heater to off, setting the hybrid system to engine-as-compressor mode and the electric heater to off, or setting the hybrid system to a dynamic mode and/or a combined mode.

Figure 7A:
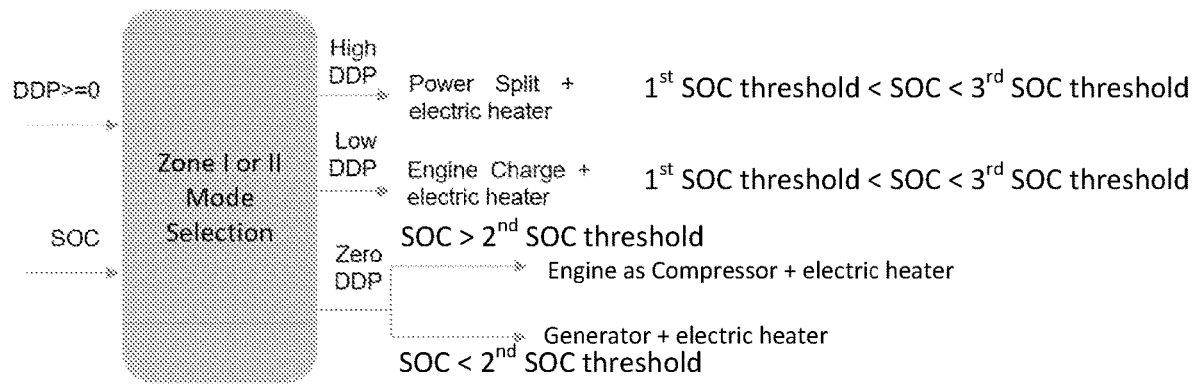
FIGS. 7A, 7B, and 7C are graphs depicting control strategies for a hybrid system based on state of charge and power demand, when in different SCR temperature zones.
Figure 7B:
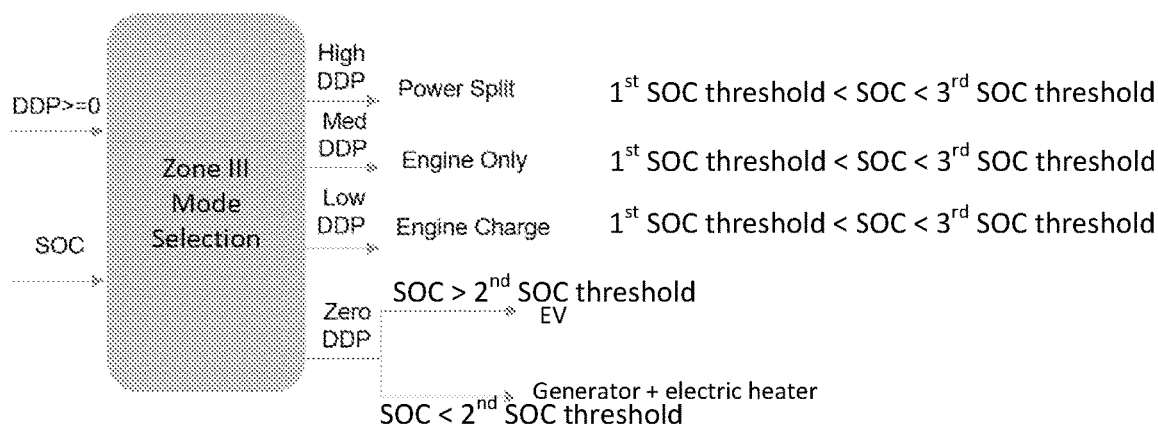
Figure 7C:
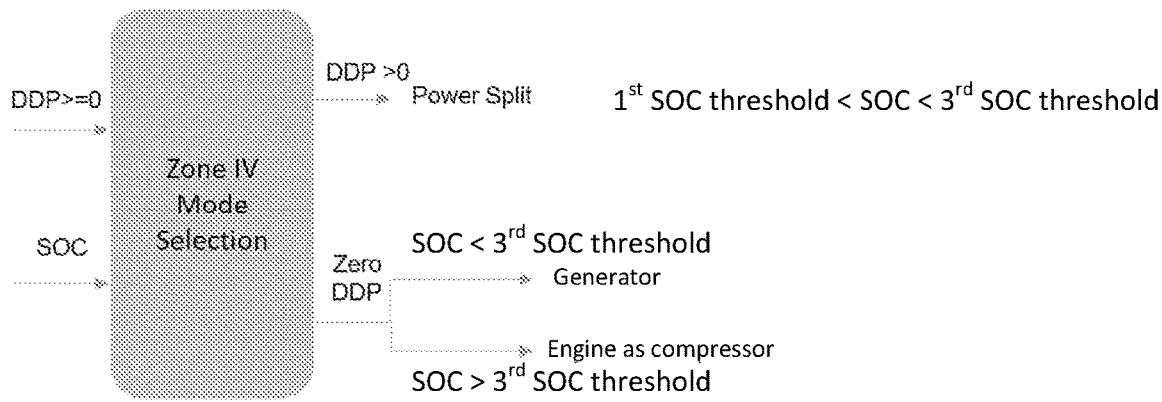

FIGS. 7A, 7B, and 7C are graphs depicting control strategies for a hybrid system with a positive power demand, based on state of charge and power demand, when in different SCR temperature zones. When the SCR temperature is in the first temperature zone or the second temperature zone, the control strategy may include, when the power demand is high and the state of charge is between a first SOC threshold and a third SOC threshold, setting the hybrid system to power-split mode and the electric heater to on; when the power demand is low and the state of charge is between the first SOC threshold and the third SOC threshold, setting the hybrid system to engine-charge mode and the electric heater to on; when the power demand is zero and the state of charge is above a second SOC threshold, setting the hybrid system to engine-as-compressor mode and the electric heater to on; and, when the power demand is zero and the state of charge is below the second SOC threshold, setting the hybrid system to generator mode and the electric heater to on. When the SCR temperature is in the third temperature zone, the control strategy may include, when the power demand is high and the state of charge is between the first SOC threshold and the third SOC threshold setting the hybrid system to power-split mode; when the power demand is medium and the state of charge is between the first SOC threshold and the third SOC threshold setting the hybrid system to engine-only mode; when the power demand is low and the state of charge is between the first SOC threshold and the third SOC threshold, setting the hybrid system to engine-charge mode; when the power demand is zero and the state of charge is above the second SOC threshold, setting the hybrid system to EV mode; and, when the power demand is zero and the state of charge is below the second SOC threshold, setting the hybrid system to generator mode and the electric heater to on. In some examples, when the SCR temperature is in the third temperature zone, the control system is configured to select system modes of the hybrid system to improve fuel efficiency, and may further improve efficiencies via CDA and/or EEVO engine technologies. When the SCR temperature is in the fourth temperature zone, the control strategy may include, when the power demand is greater than zero and the state of charge is between the first SOC threshold and the third SOC threshold, setting the hybrid system to power-split mode; when the power demand is zero and the state of charge is below the third SOC threshold, setting the hybrid system to generator-mode; and when the power demand is zero and the state of charge is above the third SOC threshold, setting the hybrid system to engine-as-compressor mode.

Figure 8A:
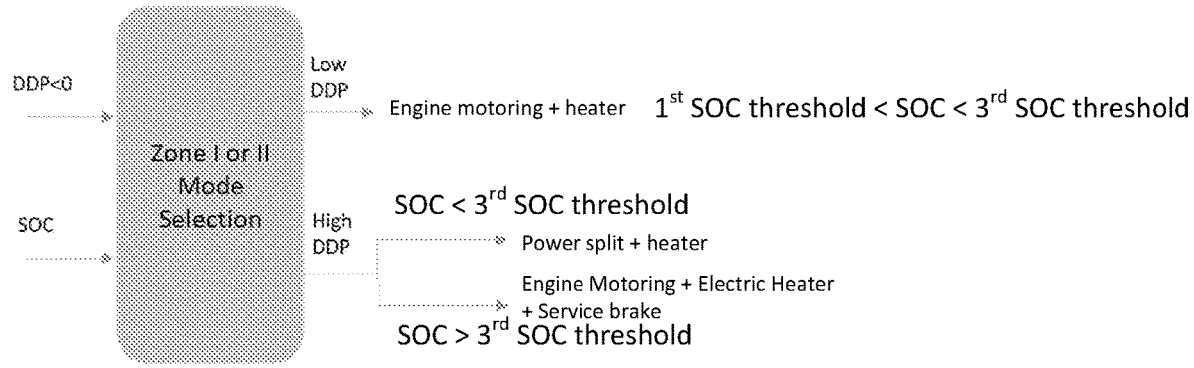
FIGS. 8A and 8B are graphs depicting control strategies for a hybrid system based on state of charge and power demand, when in different SCR temperature zones.
Figure 8B:
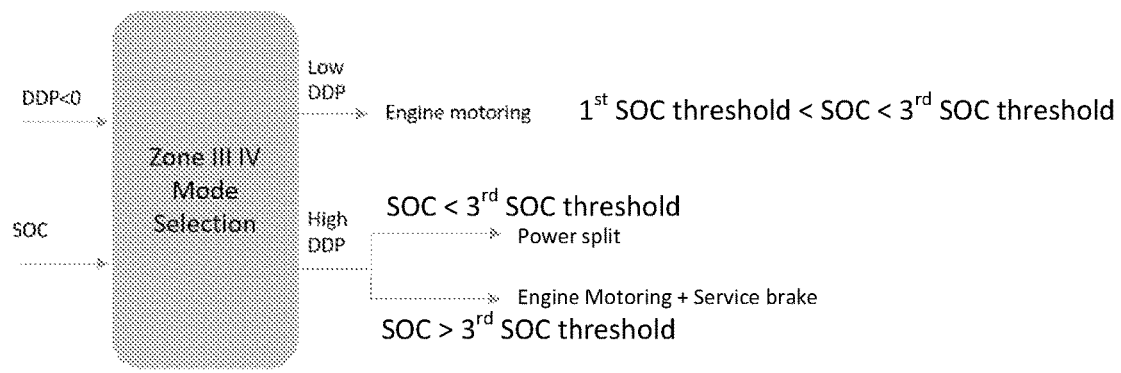

FIG. 8A and FIG. 8B are graphs depicting control strategies for a hybrid system with a negative power demand, based on state of charge and power demand, when in different SCR temperature zones. When the SCR temperature is in the first temperature zone or the second temperature zone, the control strategy may include, when the magnitude of the power demand is low and the state of charge is between a first SOC threshold and a third SOC threshold, setting the hybrid system to engine-motoring mode and the electric heater to on; when the magnitude of the power demand is high and the state of charge is below the third SOC threshold, setting the hybrid system to power-split mode and the electric heater to on; and, when the magnitude of the power demand is high and the state of charge is above the third SOC threshold, setting the hybrid system to engine-motoring mode, the electric heater to on, and the service brake on. In various examples, the motor works as a generator to capture regenerative braking energy and store the captured energy in the energy storage system. When the SCR temperature is in the third temperature zone or the fourth temperature zone, the control strategy may include, when the magnitude of the power demand is low and the state of charge is between the first SOC threshold and the third SOC threshold, setting the hybrid system to engine-motoring mode; when the magnitude of the power demand is high and the state of charge is below the third SOC threshold, setting the hybrid system to power-split mode, and/or setting the electric motor to work as a generator to capture regenerative breaking energy and store the captured energy into the energy storage system; and, when the magnitude of the power demand is high and the state of charge is above the third SOC threshold, setting the hybrid system to engine-motoring mode and the service brake on. In some examples, such as when the hybrid system does not include a clutch, when the power demand is negative, the control system is configured to control the hybrid system to first satisfy the power demand via engine motoring, and when the magnitude of the power demand is lower than a motoring curve, the control system is configured to control the hybrid system to first use the motoring power of the engine, then uses the electric motor to satisfy the remaining power. In other examples, such as when the hybrid system includes a clutch, when power demand is negative, the control system is configured to disengage the clutch, and control the motor generator to capture regenerative braking energy, and when the magnitude of the power demand is lower than the MG generator curve, the control system is configured to close the clutch and control the engine to be engaged to satisfy the remaining power.

Figure 9:
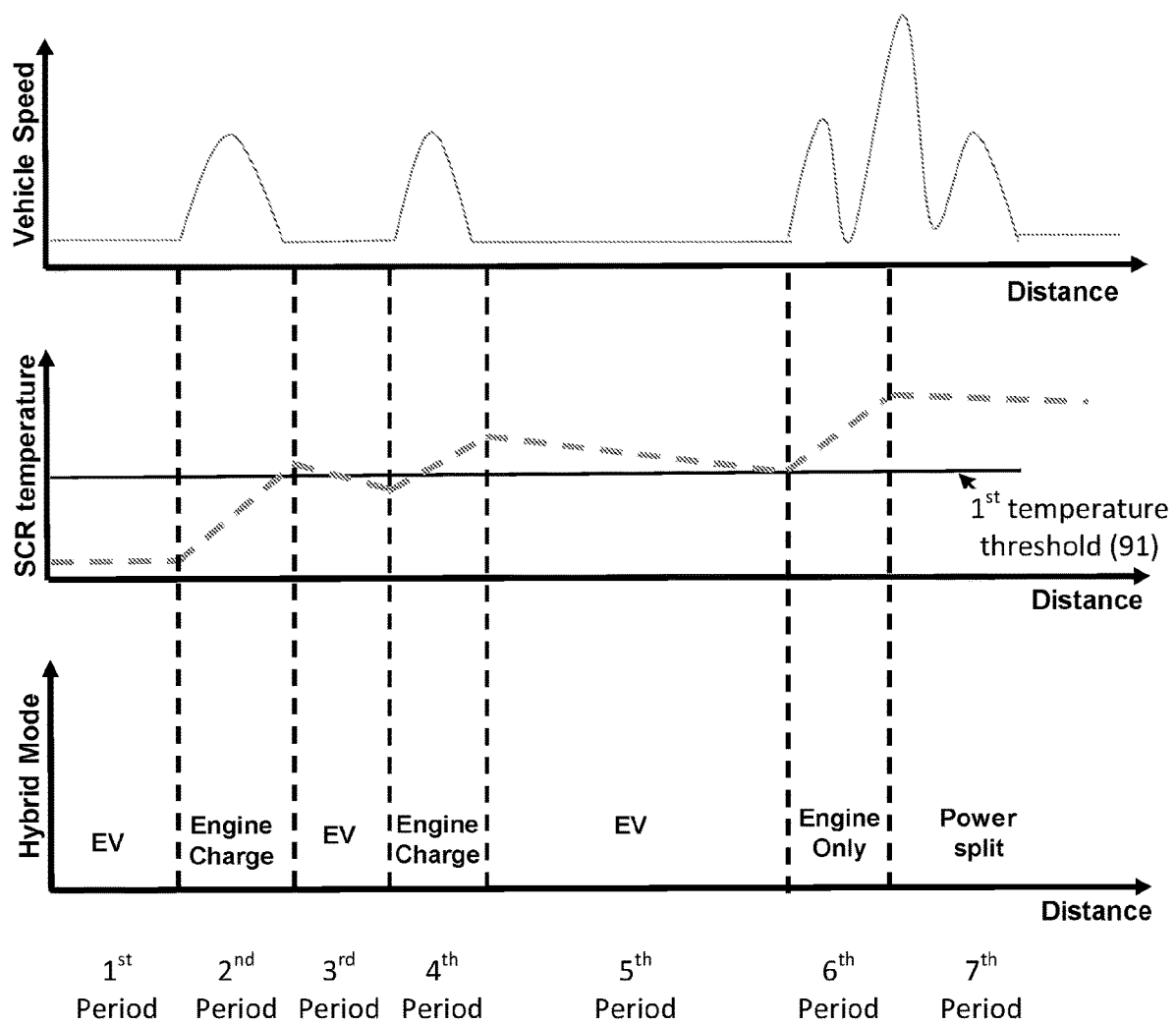
FIG. 9 is a graph depicting a timing diagram of the control system of FIG. 4 showing the changing of hybrid system modes at different vehicle speeds and SCR temperatures.

FIG. 9 is a graph depicting a timing diagram of the control system of FIG. 4 showing the changing of hybrid system modes at different vehicle speeds and SCR temperatures. As illustrated, a control system (e.g., the control system 40) is configured to perform a method (e.g., the method 30) for determining a control strategy to transition a hybrid system between a motor-operation mode, a power-split mode, an engine-charge mode, and an engine-only mode. The motor-operation mode may be referred to as EV mode. As shown, the mode of the hybrid system is selected at least based on the temperature of the system and/or the power demand, which may be represented by the acceleration of the vehicle as illustrated by the vehicle speed curve in FIG. 9. In this example, it is desirable to maintain the SCR temperature above the first temperature threshold 91 (e.g., corresponding to the first temperature threshold 51 of FIG. 3, the first temperature threshold 61 of FIG. 6, or the second temperature threshold 62 of FIG. 6) for optimal SCR conversion efficiencies. Thus, when the SCR temperature is below the first temperature threshold 91, the control strategy includes setting the hybrid system to modes configured to heat the aftertreatment system. In some examples, the control system is configured to use EV mode to reduce or avoid NOx generation when the SCR temperature is within the first temperature zone, such as during cold start. The control system may control the hybrid system to achieve desirable turbine outlet temperature (TOT) points to generate extra power for charging the battery during low load (e.g., power demand) and suitable vehicle moving conditions. The control system may set the hybrid system to power-split or generator modes to avoid overly elevated SCR temperature.

The control system may set the hybrid system to EV mode to keep SCR temperature at a desired warm temperature.

As illustrated, at a first time period, when the temperature of the SCR system is lower than a first temperature threshold 91 and the power demand of the hybrid system 10 is zero or approximately zero, the control strategy includes setting the hybrid system to motor-operation mode to reduce or avoid NOx generation, such as during cold start. At a second time period, when the temperature of the SCR system is lower than the first temperature threshold 91 and when the power demand is moderate, the control strategy includes setting the hybrid system to engine-charge mode to run the combustion engine at a work capacity required for accelerating the vehicle and for providing energy (e.g., electric motor works as generator) for charging an energy storage system connected to the electric motor. At a third time period, when the temperature of the SCR system is about the first temperature threshold and when the power demand is low or near zero, the control strategy includes setting the hybrid system to motor-operation mode to reduce or avoid NOx generation. At a fourth time period, when the temperature of the SCR system is about the first temperature threshold and when the power demand is moderate, the control strategy includes setting the hybrid system to engine-charge mode to meet the acceleration demand. At a fifth time period, when the temperature of the SCR system is above the first temperature threshold 91 and when the power demand is zero or approximately zero, the control strategy includes setting the hybrid system to motor-operation mode to reduce or avoid NOx generation. At a sixth time period, when the temperature of the SCR system is above the first temperature threshold 91 and when the power demand is moderate or high, the control strategy includes setting the hybrid system to engine-only mode to meet the acceleration demand. At a seventh time period, when the temperature of the SCR system is moderately above the first temperature threshold 91 and when the power demand is high or moderate, the control strategy includes setting the hybrid system to power-split mode such that both the electric motor and the combustion engine are running to provide power for accelerating the vehicle.

Figure 10:
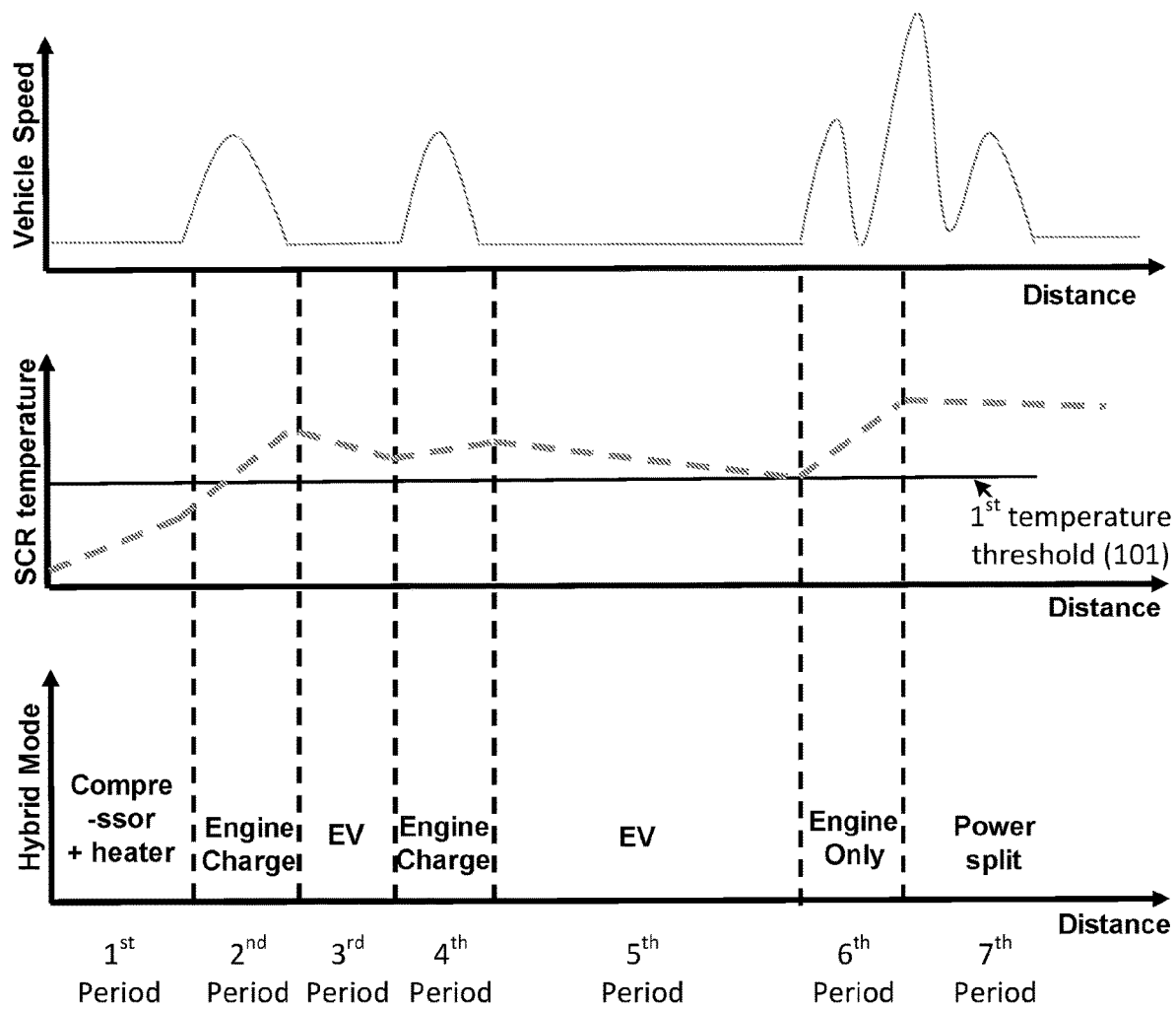
FIG. 10 is a graph depicting a timing diagram of the control system of FIG. 4 showing the changing of hybrid system modes at different vehicle speeds and SCR temperatures.

FIG. 10 is a graph depicting a timing diagram of the control system of FIG. 4 showing the changing of hybrid system modes at different vehicle speeds and SCR temperatures. As illustrated, a control system (e.g., the control system 40) is configured to perform a method (e.g., the method 30) for determining a control strategy to transition a hybrid system between a compressor mode, an engine-charge mode, a motor-operation mode, an engine-only mode, and a power-split mode. The motor-operation mode may be referred to as EV mode. As shown, the mode of the hybrid system is selected at least based on the temperature of the system and/or the power demand, which may be represented by the acceleration of the vehicle as illustrated by the vehicle speed curve in FIG. 10. In this example, it is desirable to maintain the SCR temperature above the first temperature threshold 101 (e.g., corresponding to the first temperature threshold 51 of FIG. 3, or the second temperature threshold 62 of FIG. 6) for optimal SCR conversion efficiencies. Thus, when the SCR temperature is below the first temperature threshold 101, the control strategy includes setting the hybrid system to modes configured to heat the aftertreatment system. In some examples, the control system is configured to set the hybrid system to compressor-mode and the electric heater to on to quickly heat up the SCR, when the SCR temperature is within the first temperature zone, such as during cold start when the vehicle is stationary. The control system may set the hybrid system to engine-charge mode and the electric heater to on to continue to heat up the SCR, when the SCR temperature is within the first temperature zone, when the vehicle is moving. The control system may set the hybrid system to EV mode to avoid EONOx and thus SONOx generation.

As illustrated, at a first time period, when the temperature of the SCR system is lower than a first temperature threshold 101 and the power demand of the hybrid system 10 is zero or approximately zero, the control strategy includes setting the hybrid system to compressor mode and/or the electric heater 17 to on to heat the aftertreatment system, such as during cold start. At a second time period, when the temperature of the SCR system is lower than the first temperature threshold 101 and when the power demand is moderate, the control strategy includes setting the hybrid system to engine-charge mode to run the combustion engine at a work capacity required for accelerating the vehicle and for providing energy (e.g., electric motor works as generator) for charging an energy storage system connected to the electric motor. At a third time period, when the temperature of the SCR system is above the first temperature threshold and when the power demand is low or near zero, the control strategy includes setting the hybrid system to motor-operation mode to reduce or avoid NOx generation and to help lower temperature of the SCR system. At a fourth time period, when the temperature of the SCR system is above the first temperature threshold and when the power demand is moderate, the control strategy includes setting the hybrid system to engine-charge mode to meet the acceleration demand. At a fifth time period, when the temperature of the SCR system is above the first temperature threshold 101 and when the power demand is zero or approximately zero, the control strategy includes setting the hybrid system to motor-operation mode to reduce or avoid NOx generation. At a sixth time period, when the temperature of the SCR system is above the first temperature threshold 101 and when the power demand is moderate or high, the control strategy includes setting the hybrid system to engine-only mode to meet the acceleration demand. At a seventh time period, when the temperature of the SCR system is moderately above the first temperature threshold 101 and when the power demand is high or moderate, the control strategy includes setting the hybrid system to power-split mode such that both the electric motor and the combustion engine are running to provide power for accelerating the vehicle.

In various embodiments, a computer-implemented method for controlling a hybrid system including an electric motor, a combustion engine, an aftertreatment system, and an electric heater coupled to the aftertreatment system, comprises: determining a system temperature zone of the aftertreatment system as being in: a first temperature zone below a first temperature threshold, a second temperature zone from the first temperature threshold to a second temperature threshold, or a third temperature zone above the second temperature threshold; determining a power demand corresponding to the operation of the hybrid system as being in: a first power demand zone if the power demand is below a power threshold, or a second power demand zone if the power demand is equal to or greater than the power threshold; and determining a control strategy based at least in part on the determined system temperature zone and the determined power demand. In certain examples, the control strategy includes a control command of setting the hybrid system to compressor mode when: the determined system temperature zone is in the first temperature zone and the determined power demand is zero, or the determined system temperature zone is in the first temperature zone and the determined power demand is in the first power demand zone. In certain examples, the control strategy further includes one control command selected from: setting the hybrid system to power-split mode, setting the hybrid system to motor-operation mode, and/or setting the hybrid system to engine-operation mode. In some examples, the method is implemented according to the method 30 of FIG. 2 and/or implemented by the control system 40 of FIG. 4.

In some embodiments, the control command of setting the hybrid system to compressor mode includes setting the combustion engine to operate as a compressor to heat the aftertreatment system.

In some embodiments, setting the combustion engine to operate as a compressor includes: setting the electric motor to operate the combustion engine as a compressor; controlling an intake valve to provide air at a first temperature to enter the combustion engine; setting the combustion engine to compress the air to heat the air to a second temperature equal to or higher than the first temperature; and controlling an exhaust valve to open and enable the heated air at the second temperature to travel from the engine to the aftertreatment system.

In some embodiments, setting the combustion engine to operate as a compressor includes controlling a valve-opening system and a fuel-injecting system such that air enters into the combustion engine and fuel is not injected into the combustion engine.

In some embodiments, determining a system temperature zone in which the aftertreatment system is in includes determining a system temperature corresponding to the aftertreatment system using a temperature sensor.

In some embodiments, when the determined system temperature zone is in the first temperature zone and the determined power demand is in the first power demand zone, the control strategy further includes: setting the electric heater to on to heat the aftertreatment system.

In some embodiments, when the determined system temperature zone is in the first temperature zone and the determined power demand is in the first power demand zone, the control strategy further includes: setting the electric heater to off, and setting the hybrid system to motor-operation mode to deliver power at least greater than or equal to the determined power demand.

In some embodiments, determining a power demand corresponding to the hybrid system includes determining the power demand corresponding to the hybrid system based at least in part on an acceleration input.

In some embodiments, when the determined system temperature zone is in the first temperature zone and the determined power demand is in the second power demand zone, the control strategy further includes: setting the hybrid system to power-split mode to deliver power at least greater than or equal to the determined power demand, and setting the electric heater to on to heat the aftertreatment system.

In some embodiments, when the determined system temperature zone is in the second temperature zone and the determined power demand is in the first power demand zone, the control strategy further includes: setting the hybrid system to power-split mode or motor-operation mode to deliver power at least greater than or equal to the determined power demand, and/or setting the electric heater to on.

In some embodiments, when the determined system temperature zone is in the second temperature zone and the determined power demand is in the second power demand zone, the control strategy further includes: setting the hybrid system to power-split mode or engine-operation mode to deliver power at least greater than or equal to the determined power demand, and/or setting the electric heater of the hybrid system to on.

In some embodiments, when the determined system temperature zone is in the third temperature zone, the control strategy further includes: setting the hybrid system to one of power-split mode and engine-operation or motor-operation mode to optimize the overall vehicle fuel efficiency to deliver power greater than or equal to the determined power demand; and/or setting the electric heater to off.

In some embodiments, the computer-implemented method further includes determining an energy-level corresponding to an energy storage system connected to the electric motor, and wherein determining a control strategy is further based on the determined energy-level.

In some embodiments, when the determined energy-level is below an energy threshold, the control strategy includes: setting the hybrid system to engine-charge mode to recharge the energy storage system.

In some embodiments, setting the hybrid system to engine-charge mode includes setting the combustion engine to deliver power greater than the determined power demand at least by a charging power demand for charging an energy storage system and/or to power the heater.

In some embodiments, the control command of setting the hybrid system to power-split mode includes splitting power between the engine and the motor, such as by setting the electric motor and engine to operate at different power levels to deliver power at least equal to or greater than the determined power demand. In the power-split mode, the combustion engine may be set to work at good efficiency region and/or lower emission region, such as based on the temperature zone and/or the power demand.

In some embodiments, the control command of setting the hybrid system to motor-operation mode includes setting the electric motor to deliver power at least greater than or equal to the determined power demand.

In some embodiments, the control command of setting the hybrid system to engine-operation mode includes setting the combustion engine to deliver power at least greater than or equal to the determined power demand.

In various embodiments, a system for controlling a hybrid system including an electric motor, a combustion engine, an aftertreatment system, and an electric heater coupled to the aftertreatment system, the system comprises: a temperature zone determining module configured to determine a system temperature zone of the aftertreatment system as being in: a first temperature zone below a first temperature threshold, a second temperature zone from the first temperature threshold to a second temperature threshold, or a third temperature zone above the second temperature threshold; a power demand determining module configured to determine a power demand corresponding to the operation of the hybrid system as being in: a first power demand zone if the power demand is below a power threshold, or a second power demand zone if the power demand is equal to or greater than the power threshold; and a control strategy determining module configured to determine a control strategy based at least in part on the determined system temperature zone and the determined power demand. In certain examples, the control strategy includes a control command of setting the hybrid system to compressor mode when: the determined system temperature zone is in the first temperature zone and the determined power demand is zero, or the determined system temperature zone is in the first temperature zone and the determined power demand is in the first power demand zone. In certain examples, the control strategy further includes one control command selected from: setting the hybrid system to power-split mode, setting the hybrid system to motor-operation mode, and setting the hybrid system to engine-operation mode. In some examples, the system is configured to implement the method 30 of FIG. 2 and/or is similar to the control system 40 of FIG. 4.

In various embodiments, a non-transitory computer-readable medium with instructions stored thereon, that when executed by a processor, cause the processor to perform: determining a system temperature zone of the aftertreatment system as being in: a first temperature zone below a first temperature threshold, a second temperature zone from the first temperature threshold to a second temperature threshold, or a third temperature zone above the second temperature threshold; determining a power demand corresponding to the operation of the hybrid system as being in: a first power demand zone if the power demand is below a power threshold, or a second power demand zone if the power demand is equal to or greater than the power threshold; and determining a control strategy based at least in part on the determined system temperature zone and the determined power demand. In certain examples, the control strategy includes a control command of setting the hybrid system to compressor mode when: the determined system temperature zone is in the first temperature zone and the determined power demand is zero, or the determined system temperature zone is in the first temperature zone and the determined power demand is in the first power demand zone. In certain examples, the control strategy further includes one control command selected from: setting the hybrid system to power-split mode, setting the hybrid system to motor-operation mode, and setting the hybrid system to engine-operation mode. In some examples, the non-transitory computer-readable medium, when executed by a processor, cause the processor to perform the method 30 of FIG. 2. In certain examples, the non-transitory computer-readable medium is executable by the control system 40 of FIG. 4.

It is to be understood that, for example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in executable by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs operating on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the disclosure is not to be limited by the specific illustrated embodiments.

What is claimed is:

1. A computer-implemented method for controlling a hybrid system including an electric motor, a combustion engine, an aftertreatment system, and an electric heater coupled to the aftertreatment system, the method comprising:
   determining a system temperature zone of the aftertreatment system as being in:
      a first temperature zone below a first temperature threshold,
      a second temperature zone between the first temperature threshold and a second temperature threshold, or
      a third temperature zone above the second temperature threshold;
   determining a power demand corresponding to the operation of the hybrid system as being in:
      a first power demand zone if the power demand is below a power threshold, or
      a second power demand zone if the power demand is equal to or greater than the power threshold; and
   determining a control strategy based at least in part on the determined system temperature zone and the determined power demand,
   wherein the control strategy includes a control command of setting the hybrid system to compressor mode when:
      the determined system temperature zone is in the first temperature zone and the determined power demand is zero, or
      the determined system temperature zone is in the first temperature zone and the determined power demand is in the first power demand zone, and
   wherein the control strategy further includes one control command selected from:
      setting the hybrid system to power-split mode,
      setting the hybrid system to motor-operation mode, and
      setting the hybrid system to engine-operation mode.

2. The computer-implemented method of claim 1, wherein the control command of setting the hybrid system to compressor mode includes setting the combustion engine to operate as a compressor to heat the aftertreatment system.

3. The computer-implemented method of claim 2, wherein the setting the combustion engine to operate as a compressor includes:
   setting the electric motor to operate the combustion engine as a compressor;
   controlling an intake valve to provide air at a first temperature to enter the combustion engine;
   setting the combustion engine to compress the air to heat the air to a second temperature equal to or higher than the first temperature; and
   controlling an exhaust valve to open and enable the heated air at the second temperature to travel from the engine to the aftertreatment system.

4. The computer-implemented method of claim 2, wherein setting the combustion engine to operate as a compressor includes controlling a valve-opening system and a fuel-injecting system such that air enters into the combustion engine and fuel is not injected into the combustion engine.

5. The computer-implemented method of claim 1, wherein the determining a system temperature zone in which the aftertreatment system is in includes determining a system temperature corresponding to the aftertreatment system using a temperature sensor.

6. The computer-implemented method of claim 1, wherein when the determined system temperature zone is in the first temperature zone and the determined power demand is in the first power demand zone, the control strategy further includes:
   setting the electric heater to on to heat the aftertreatment system.

7. The computer-implemented method of claim 1, wherein when the determined system temperature zone is in the first temperature zone and the determined power demand is in the first power demand zone, the control strategy further includes:
   setting the electric heater to off, and
   setting the hybrid system to motor-operation mode to deliver power at least greater than or equal to the determined power demand.

8. The computer-implemented method of claim 1, wherein determining a power demand corresponding to the hybrid system includes determining the power demand corresponding to the hybrid system based at least in part on an acceleration input.

9. The computer-implemented method of claim 1, wherein when the determined system temperature zone is in the first temperature zone and the determined power demand is in the second power demand zone, the control strategy further includes:
   setting the hybrid system to power-split mode to deliver power at least greater than or equal to the determined power demand, and
   setting the electric heater to on to heat the aftertreatment system.

10. The computer-implemented method of claim 1, wherein when the determined system temperature zone is in the second temperature zone and the determined power demand is in the first power demand zone, the control strategy further includes:
    setting the hybrid system to power-split mode or motor-operation mode to deliver power at least greater than or equal to the determined power demand, and
    setting the electric heater to on.

11. The computer-implemented method of claim 1, wherein when the determined system temperature zone is in the second temperature zone and the determined power demand is in the second power demand zone, the control strategy further includes:
    setting the hybrid system to power-split mode or engine-operation mode to deliver power at least greater than or equal to the determined power demand, and
    setting the electric heater of the hybrid system to on.

12. The computer-implemented method of claim 1, wherein when the determined system temperature zone is in the third temperature zone, the control strategy further includes:
    setting the hybrid system to one of power-split mode and engine-operation or motor-operation mode to optimize the overall vehicle fuel efficiency to deliver power greater than or equal to the determined power demand; and
    setting the electric heater to off.

13. The computer-implemented method of claim 1, further comprising determining an energy-level corresponding to an energy storage system connected to the electric motor, and wherein determining a control strategy is further based on the determined energy-level.

14. The computer-implemented method of claim 13, wherein when the determined energy-level is below an energy threshold, the control strategy includes:
  setting the hybrid system to engine-charge mode to recharge the energy storage system.

15. The computer-implemented method of claim 14, wherein setting the hybrid system to engine-charge mode includes setting the combustion engine to deliver power greater than the determined power demand at least by a charging power demand for charging an energy storage system connected to the electric motor.

16. The computer-implemented method of claim 1, wherein the control command of setting the hybrid system to power-split mode includes setting the electric motor and engine to operate at different power levels to deliver power at least equal to or greater than the determined power demand.

17. The computer-implemented method of claim 1, wherein the control command of setting the hybrid system to motor-operation mode includes setting the electric motor to deliver power at least greater than or equal to the determined power demand.

18. The computer-implemented method of claim 1, wherein the control command of setting the hybrid system to engine-operation mode includes setting the combustion engine to deliver power at least greater than or equal to the determined power demand.

19. A system for controlling a hybrid system including an electric motor, a combustion engine, an aftertreatment system, and an electric heater coupled to the aftertreatment system, the system comprising:
  a temperature zone determining module configured to determine a system temperature zone of the aftertreatment system as being in:
    a first temperature zone below a first temperature threshold,
    a second temperature zone from the first temperature threshold to a second temperature threshold, or
    a third temperature zone above the second temperature threshold;
  a power demand determining module configured to determine a power demand corresponding to the operation of the hybrid system as being in:
    a first power demand zone if the power demand is below a power threshold, or
    a second power demand zone if the power demand is equal to or greater than the power threshold; and
  a control strategy determining module configured to determine a control strategy based at least in part on the determined system temperature zone and the determined power demand,
  wherein the control strategy includes a control command of setting the hybrid system to compressor mode when:
    the determined system temperature zone is in the first temperature zone and the determined power demand is zero, or
    the determined system temperature zone is in the first temperature zone and the determined power demand is in the first power demand zone, and
  wherein the control strategy further includes one control command selected from:
    setting the hybrid system to power-split mode,
    setting the hybrid system to motor-operation mode, and
    setting the hybrid system to engine-operation mode.

20. A non-transitory computer-readable medium with instructions stored thereon, that when executed by a processor, cause the processor to perform:
  determining a system temperature zone of the aftertreatment system as being in:
    a first temperature zone below a first temperature threshold,
    a second temperature zone from the first temperature threshold to a second temperature threshold, or
    a third temperature zone above the second temperature threshold;
  determining a power demand corresponding to the operation of the hybrid system as being in:
    a first power demand zone if the power demand is below a power threshold, or
    a second power demand zone if the power demand is equal to or greater than the power threshold; and
  determining a control strategy based at least in part on the determined system temperature zone and the determined power demand,
  wherein the control strategy includes a control command of setting the hybrid system to compressor mode when:
    the determined system temperature zone is in the first temperature zone and the determined power demand is zero, or
    the determined system temperature zone is in the first temperature zone and the determined power demand is in the first power demand zone, and
  wherein the control strategy further includes one control command selected from:
    setting the hybrid system to power-split mode,
    setting the hybrid system to motor-operation mode, and
    setting the hybrid system to engine-operation mode.

* * * * *